(12) United States Patent
Power et al.

(10) Patent No.: US 12,452,333 B2
(45) Date of Patent: Oct. 21, 2025

(54) ENHANCED MANAGEMENT OF EGRESS TRAFFIC TO A PEER COMMUNICATIONS NETWORK

(71) Applicant: Level 3 Communications, LLC, Broomfield, CO (US)

(72) Inventors: William Power, Boulder, CO (US); Glenn Goldstein, Brooklyn, NY (US)

(73) Assignee: Level 3 Communications, LLC, Denver, CO (US)

( * ) Notice: Subject to any disclaimer, the term of this patent is extended or adjusted under 35 U.S.C. 154(b) by 42 days.

(21) Appl. No.: 18/522,087

(22) Filed: Nov. 28, 2023

(65) Prior Publication Data

US 2025/0141954 A1    May 1, 2025

Related U.S. Application Data

(60) Provisional application No. 63/594,686, filed on Oct. 31, 2023.

(51) Int. Cl.
| | |
|---|---|
| *G06F 15/16* | (2006.01) |
| *H04L 12/14* | (2006.01) |
| *H04L 67/1008* | (2022.01) |
| *H04L 67/1012* | (2022.01) |

(52) U.S. Cl.
CPC ...... *H04L 67/1008* (2013.01); *H04L 12/1489* (2013.01); *H04L 67/1012* (2013.01)

(58) Field of Classification Search
CPC ............. H04L 67/1008; H04L 12/1489; H04L 67/1012
USPC ........................................................ 709/224
See application file for complete search history.

(56) References Cited

U.S. PATENT DOCUMENTS

| | | | | |
|---|---|---|---|---|
| 6,721,797 | B1 * | 4/2004 | Kim .................... | H04L 12/5602 709/224 |
| 6,728,748 | B1 * | 4/2004 | Mangipudi ......... | H04L 67/1023 718/105 |
| 7,222,190 | B2 * | 5/2007 | Klinker ............... | H04L 43/0829 709/239 |
| 7,269,157 | B2 * | 9/2007 | Klinker .............. | H04L 41/0816 370/228 |
| 7,408,923 | B1 * | 8/2008 | Khan ...................... | H04L 12/66 713/300 |
| 7,467,067 | B2 * | 12/2008 | Marvasti ................ | G06N 20/00 702/186 |
| 7,558,481 | B2 * | 7/2009 | Jenkins ............... | H04J 14/0279 398/79 |

(Continued)

*Primary Examiner* — Alicia Baturay

(57) ABSTRACT

This disclosure describes systems, methods, and devices related to managing egress traffic from a network to one or more peer networks. A method may include generating, using a load balancer of a network, a dynamic logical egress traffic threshold for a peer network; determining, using the load balancer, that first traffic from the network to the peer network is below the logical egress traffic threshold; directing second traffic from the network to the peer network based on the determination that the first traffic is below the logical egress traffic threshold; determining, using the load balancer, that the second traffic from the network to the peer network has reached the logical egress traffic threshold; and directing third traffic from the network away from the peer network based on the determination that the second traffic has reached the logical egress traffic threshold.

18 Claims, 5 Drawing Sheets

(56) References Cited

U.S. PATENT DOCUMENTS

| | | | |
|---|---|---|---|
| 7,561,517 B2* | 7/2009 | Klinker | H04L 47/20 370/235 |
| 7,584,298 B2* | 9/2009 | Klinker | H04L 45/24 709/239 |
| 7,764,628 B2* | 7/2010 | Gerber | H04L 43/00 370/254 |
| 7,801,703 B2* | 9/2010 | Marvasti | G06N 20/00 702/186 |
| 7,885,186 B2* | 2/2011 | MacLean | H04J 3/1617 370/230.1 |
| 7,903,557 B1* | 3/2011 | Colloff | H04L 47/125 370/231 |
| 8,060,342 B2* | 11/2011 | Marvasti | G06N 20/00 702/186 |
| 8,134,053 B2* | 3/2012 | Gehin | A01H 5/10 800/278 |
| 8,478,233 B2* | 7/2013 | Liu | H04M 15/80 455/406 |
| 8,743,893 B2* | 6/2014 | Cowie | H04W 40/18 370/395.31 |
| 8,780,902 B1* | 7/2014 | Colloff | H04L 47/125 370/252 |
| 8,831,019 B2* | 9/2014 | Cowie | H04W 40/18 370/395.31 |
| 8,869,165 B2* | 10/2014 | Dasgupta | G06F 9/5038 718/106 |
| 8,928,503 B2* | 1/2015 | Oggier | H03M 13/373 341/94 |
| 8,949,459 B1* | 2/2015 | Scholl | H04L 45/04 709/239 |
| 9,154,826 B2* | 10/2015 | Raleigh | H04N 21/478 |
| 9,300,814 B2* | 3/2016 | Thapar | H04L 41/5029 |
| 9,531,749 B2* | 12/2016 | Kementsietsidis | H04L 67/1001 |
| 9,532,227 B2* | 12/2016 | Richards | H04L 43/062 |
| 9,544,195 B1* | 1/2017 | Garg | H04M 15/8214 |
| 9,559,973 B1* | 1/2017 | Aithal | H04L 47/29 |
| 9,577,925 B1* | 2/2017 | Bahadur | H04L 45/50 |
| 9,591,675 B2* | 3/2017 | Jung | H04W 8/005 |
| 9,749,209 B2* | 8/2017 | Cimino | H04L 43/0876 |
| 9,755,842 B2* | 9/2017 | Raleigh | H04M 15/58 |
| 9,763,093 B2* | 9/2017 | Richards | H04W 12/128 |
| 9,769,643 B2* | 9/2017 | Baron | H04M 15/85 |
| 9,772,885 B2* | 9/2017 | Vernia | H04L 41/0895 |
| 9,929,995 B2* | 3/2018 | Blinn | H04L 51/18 |
| 9,954,845 B2* | 4/2018 | Charette | H04L 63/0815 |
| 10,051,533 B2* | 8/2018 | Fitzpatrick | H04W 48/14 |
| 10,051,680 B2* | 8/2018 | Jung | H04W 8/005 |
| 10,111,062 B2* | 10/2018 | Soelberg | H04M 15/09 |
| 10,225,683 B1* | 3/2019 | Howard | H04W 4/02 |
| 10,314,098 B2* | 6/2019 | Jung | H04W 4/80 |
| 10,374,927 B2* | 8/2019 | Cimino | H04L 43/16 |
| 10,397,062 B2* | 8/2019 | Chen | H04L 43/20 |
| 10,516,584 B2* | 12/2019 | Vodopivec | H04L 43/022 |
| 10,523,978 B1* | 12/2019 | Nielsen | H04N 21/2385 |
| 10,652,304 B1* | 5/2020 | Nielsen | H04L 65/80 |
| 10,666,702 B1* | 5/2020 | Nielsen | H04L 65/765 |
| 10,715,342 B2* | 7/2020 | Raleigh | H04M 15/51 |
| 10,785,615 B2* | 9/2020 | Baron | H04M 15/28 |
| 10,911,796 B2* | 2/2021 | Nielsen | H04N 21/2343 |
| 10,931,964 B2* | 2/2021 | Symes | H04N 19/43 |
| 10,932,170 B2* | 2/2021 | Fitzpatrick | H04W 36/04 |
| 10,936,449 B2* | 3/2021 | Nguyen | G06F 11/2041 |
| 10,985,989 B2* | 4/2021 | Chen | H04L 43/20 |
| 11,057,286 B2* | 7/2021 | Cimino | H04L 43/0876 |
| 11,128,491 B2* | 9/2021 | Wondra | H04L 12/4633 |
| 11,218,854 B2* | 1/2022 | Raleigh | H04M 15/765 |
| 11,363,423 B2* | 6/2022 | Baron | H04M 15/785 |
| 11,382,030 B2* | 7/2022 | Xu | H04W 36/22 |
| 11,438,302 B1* | 9/2022 | Majkowski | H04L 61/5069 |
| 11,451,478 B1* | 9/2022 | Torvi | H04L 47/125 |
| 11,533,197 B2* | 12/2022 | Wondra | H04L 45/64 |
| 11,546,374 B2* | 1/2023 | van der Mandele | H04L 63/1408 |
| 11,563,592 B2* | 1/2023 | Raleigh | H04L 41/5054 |
| 11,563,663 B2* | 1/2023 | Cimino | H04L 43/16 |
| 11,855,958 B2* | 12/2023 | Majkowski | H04L 61/5069 |
| 11,864,070 B2* | 1/2024 | Baron | H04M 15/8214 |
| 11,894,947 B2* | 2/2024 | Wondra | H04L 45/64 |
| 11,895,149 B2* | 2/2024 | van der Mandele | H04L 69/325 |
| 12,143,909 B2* | 11/2024 | Raleigh | H04M 15/00 |
| 2002/0025795 A1* | 2/2002 | Sharon | H04W 24/00 455/423 |
| 2004/0127204 A1* | 7/2004 | Belmont | H04W 48/18 455/418 |
| 2008/0240082 A1* | 10/2008 | Feldman | H04L 12/66 370/352 |
| 2008/0240083 A1* | 10/2008 | Feldman | H04L 12/66 370/352 |
| 2008/0244260 A1* | 10/2008 | Feldman | H04L 12/66 713/153 |
| 2008/0274715 A1* | 11/2008 | Heit | H04M 15/53 455/406 |
| 2012/0173709 A1* | 7/2012 | Li | G06F 9/5011 709/224 |
| 2016/0066261 A1* | 3/2016 | Nasielski | H04L 12/145 455/406 |
| 2018/0249017 A1* | 8/2018 | Karam | H04W 4/24 |
| 2024/0333784 A1* | 10/2024 | Reznik | H04L 65/612 |
| 2025/0013736 A1* | 1/2025 | Poornachandran | G06F 21/52 |

* cited by examiner

ENHANCED MANAGEMENT OF EGRESS TRAFFIC TO A PEER COMMUNICATIONS NETWORK

CROSS-REFERENCE TO RELATED APPLICATIONS

This application is related to and claims priority under 35 U.S.C. § 119 (c) from U.S. Patent Application No. 63/594,686, filed Oct. 31, 2023, titled "ENHANCED MANAGEMENT OF EGRESS TRAFFIC TO A PEER COMMUNICATIONS NETWORK," the entire content of which is incorporated herein by reference for all purposes.

TECHNICAL FIELD

Embodiments of the present invention generally relate to devices, systems, and methods for enhanced management of egress traffic to a peer communications network.

BACKGROUND

When a communications network directs egress traffic to a peer communications network, the peer communications network often charges based on a threshold amount of the egress traffic directed from the communications network to the peer communications network to allow for some bursts in traffic above the threshold without charging for the overages from the bursts. However, the communications network may not direct the threshold amount of the egress traffic to the peer communications network for much of the time period for which the communications network is charged based on the threshold amount, so the communications network may be paying for egress bandwidth that it is not fully utilizing. There is therefore a need for enhanced management of egress traffic to a peer communications network.

SUMMARY

A method of managing egress traffic to a peer network may include: generating, by a device, using a load balancer of a network, a logical egress traffic threshold for a peer network; determining, by the device, using the load balancer, that first traffic from the network to the peer network is below the logical egress traffic threshold; directing, by the device, second traffic from the network to the peer network based on the determination that the first traffic is below the logical egress traffic threshold; determining, by the device, using the load balancer, that the second traffic from the network to the peer network has reached the logical egress traffic threshold; and directing, by the device, third traffic from the network away from the peer network based on the determination that the second traffic has reached the logical egress traffic threshold.

A device for managing egress traffic to a peer network may: generate, using a load balancer of a network, a logical egress traffic threshold for a peer network; determine, using the load balancer, that first traffic from the network to the peer network is below the logical egress traffic threshold; direct second traffic from the network to the peer network based on the determination that the first traffic is below the logical egress traffic threshold; determine, using the load balancer, that the second traffic from the network to the peer network has reached the logical egress traffic threshold; and direct third traffic from the network away from the peer network based on the determination that the second traffic has reached the logical egress traffic threshold.

A system for managing egress traffic to a peer network, the system including: a load balancer of a network; and at least one processor coupled to memory, the at least one processor configured to: generate, using the load balancer, a logical egress traffic threshold for a peer network; determine, using the load balancer, that first traffic from the network to the peer network is below the logical egress traffic threshold; direct second traffic from the network to the peer network based on the determination that the first traffic is below the logical egress traffic threshold; determine, using the load balancer, that the second traffic from the network to the peer network has reached the logical egress traffic threshold; and direct third traffic from the network away from the peer network based on the determination that the second traffic has reached the logical egress traffic threshold.

DETAILED DESCRIPTION

Figure 1:
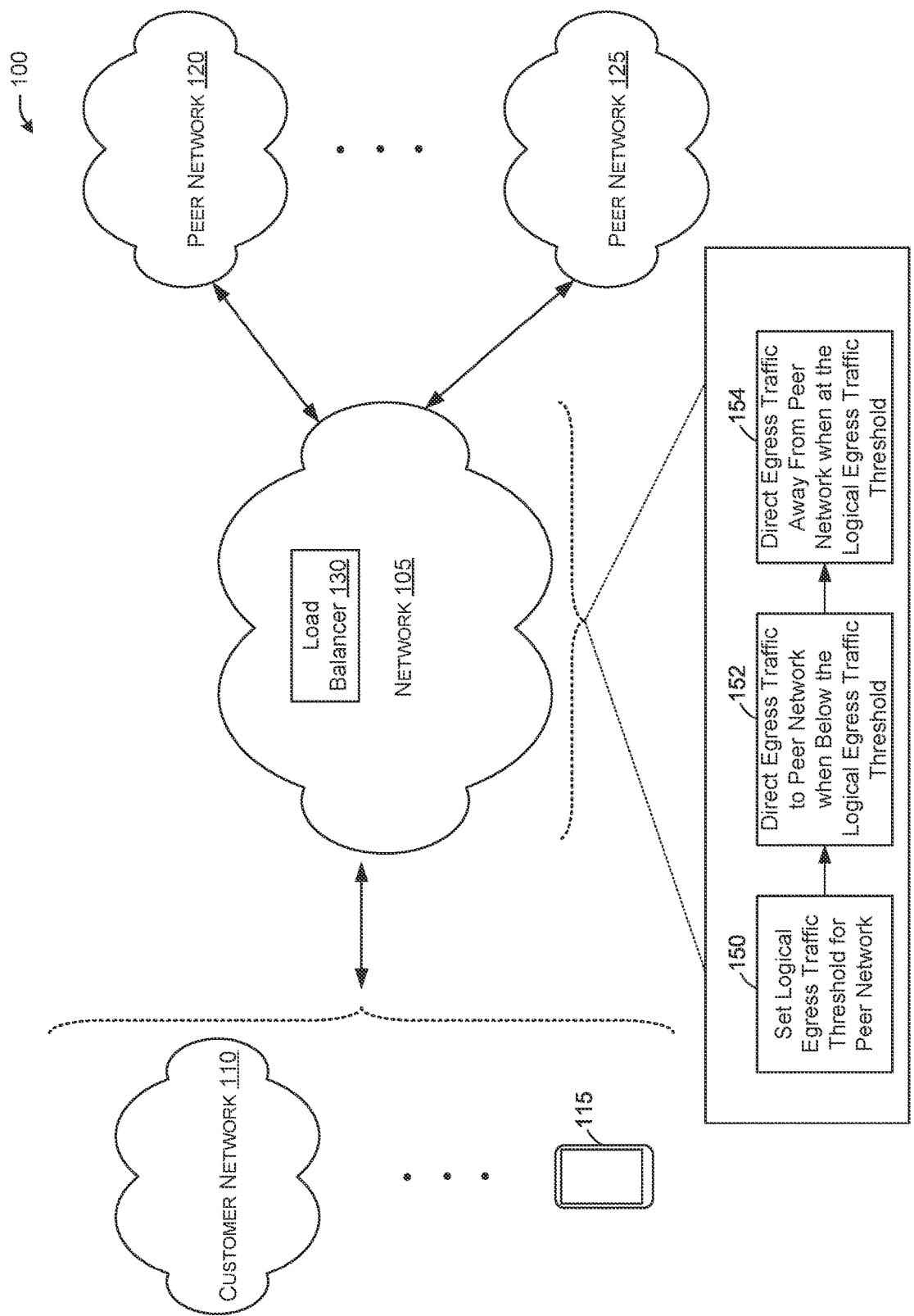
FIG. 1 illustrates an exemplary network for managing egress traffic to peer communication networks in accordance with one embodiment.

Aspects of the present disclosure involve devices, systems, methods, and the like, for enhanced management of egress traffic to a peer communications network.

Communications networks sometimes offload traffic (e.g., egress traffic) to peer networks. For example, when network traffic demand is high during an event, the network may divert egress traffic to one or more peer networks. Traffic from a network may egress from the network in one of multiple modes. One mode is to egress traffic from the network to a settlement-free peer ISP. Another mode is to egress traffic from the network to a paid peer ISP. The billing for a paid peer may be based on the 95th percentile of egress traffic amount (e.g., traversing the communication pipe from the network to the paid peer).

The peer networks charge for egress to their peer Internet Service Providers (ISPs), often using a threshold percentage of the traffic level over a time period. For example, paid peers may charge based on 95th percentile egress traffic levels (e.g., bandwidth usage) over a month. When the 95th percentile egress traffic level on a link is 100 Gbps, the network diverting the egress traffic to the peer network may be charged for that 100 Gbps for a full month, even if the network diverting the egress traffic only uses 100 Gbps for a few days during that month.

Some traffic events, such as sporting events, game releases, and the like, have a bursty traffic nature in that they will exhibit higher traffic levels near or above the 95th percentile for short time periods within a billing period. For example, in a billing cycle of one month, utilization of a peer network for egress traffic may be around 10% for 25 of the 30 days, and for the other five days of the month, usage may be around 90%. The customer would be billed at the 95th percentile for the entire month.

The effective charge per gigabyte (GB) delivered (e.g., cost/GB) is highly dependent on how well the network diverting the egress traffic to the peer network can optimize utilization of the paid peering links. For example, if the network diverting the egress traffic to the peer network only delivers 100 Gbps over a paid link to the peer network for a few days per month, the network diverting the egress traffic to the peer network would be charged for that 100 Gbps for the full month. The effective price per GB would be: Cost=100 Gbps for the full month; GB delivered=100 Gbps converted to GB over the days that the network used the peering links; effective cost per GB=Cost/GB delivered. The lower the utilization of the link, the higher the effective cost per GB.

Carriers may sample the amount of data transferred on a customer's port in time intervals, such as every five minutes, and use that data amount to determine a data rate used for that time interval. The values for multiple time intervals over a billing cycle (e.g., a month) may be ranked by percentile, and the value on the $95^{th}$ percentile may be used to bill a customer. The higher a customer's base commitment rate, the lower their traffic volume cost (e.g., per-Mbps cost) may be. A customer may purchase more bandwidth to avoid their $95^{th}$ percentile rate being higher than their base commit rate, and therefore to avoid paying more than their base commit rate. The $95^{th}$ percentile allows for bursts above the threshold, unlike other techniques with hard caps on traffic (e.g., committed information rate), and carriers may not need to police the egress traffic to a particular customer's commit rate for enforcement. Large traffic events for shorter time periods, such as sporting and gaming events, benefit from a $95^{th}$ percentile model allowing for shorter bursts of higher egress traffic to a peer network.

In one or more embodiments, a traffic load balancer of a network may be enhanced to dictate the $95^{th}$ percentile traffic threshold as a logical traffic level (e.g., rather than a physical traffic level) for egress traffic to a peer network. Using metrics from the network as feedback to the load balancer, the load balancer may determine when to allow or not allow more egress traffic to a peer link. In particular, the load balancer may prevent egress traffic to a peer that would drive a target $95^{th}$ percentile at the peer to a higher $95^{th}$ percentile threshold.

In one or more embodiments, by tracking traffic delivered on paid peering links, a communication network can move traffic to different egress locations to maximize how well the communication network fills paid peering links (e.g., to peer networks). When the network detects that egress traffic to a peer network is reaching a threshold (e.g., the $95^{th}$ percentile), the network may divert traffic to another network to avoid going over the threshold and risk the threshold being increased (e.g., thereby increasing the amount that the peer network may charge for the egress traffic).

In one or more embodiments, the communications network may set a target for the egress traffic threshold (e.g., the $95^{th}$ percentile threshold) for a peer network link. Setting the egress traffic threshold may be based on logical limitations rather than physical limitations. For example, the threshold may be set at a level where the traffic could meet quality of service (QOS) or other physical network limitations (e.g., network capacity, packet loss, throughput, latency, etc.). Instead of such physical limitations dictating the threshold, the network may set the threshold based on a traffic demand of the network's customers that can be satisfied by the network, the cost of egress traffic to one or more peer networks, and the amount that a customer may pay for the traffic (e.g., whether the customer is price-sensitive). In this manner, a network may have sufficient capacity for traffic demand, and may meet QoS requirements for that demand, but still may divert traffic to other networks (e.g., peer networks) due to logical limitations related to customer demand and cost. For example, a higher $95^{th}$ percentile threshold may be allowed if a customer is known to pay higher GB/time rates. The threshold also may be dynamic, changing over time based on multiple customers use and cost, and changing traffic demand. Which customers traffic is diverted to a peer network and how much may depend on which customers are driving the traffic demand, how much the customers are willing to pay, and the cost of the egress traffic based on the threshold at the peer network.

In one or more embodiments, the communications network may automatically monitor traffic on a paid peering link to fully utilize the link under the threshold traffic level. If traffic is under the threshold, the network may instruct network edge servers to send more traffic over the paid peering link. The network may prioritize sending customer traffic with the highest cost/GB rate over the paid peering links. If traffic is at the threshold, the network may instruct the network edge servers to move traffic away from the paid peering links, and instead allow the traffic to egress at a location that is settlement-free or at a lower cost rate.

In one or more embodiments, when egress traffic is lower than the $95^{th}$ percentile at a peer network, the load balancer may allow for more traffic from other peer networks to be diverted to the peer network whose egress traffic level is below the $95^{th}$ percentile. This allows for better performance and for using more of the traffic that is paid for based on the $95^{th}$ percentile, but would otherwise not be used. The effective cost per GB for the network could be reduced accordingly.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an exemplary network 100 for managing egress traffic to peer communication networks in accordance with one embodiment.

Referring to FIG. 1, the network 100 may include a network 105 (e.g., a content delivery network, communications network, or other type of network delivering traffic) and multiple other networks and devices. The other networks and devices may include customer network 110, customer device 115, peer network 120, and peer network 125. The network 105 may include one or more load balancers (e.g., load balancer 130) for managing traffic load, and determining when to divert or not divert egress traffic to a peer network.

The customer network 110 and/or the customer device 115 may send or receive traffic using the network 105. To increase physical capacity of the network 105, the network 105 may use the peer network 120 and/or the peer network 125, any of which may be paid peers or settlement-free peers to which to divert traffic to/from the customer network 110 and/or the customer device 115. The network 105, using the load balancer 130, may set a logical egress traffic threshold for a respective peer network (e.g., using a $95^{th}$ percentile threshold for traffic volume to the respective peer network from the network 105) at step 150. For example, the network 105 may set a target for the egress traffic threshold (e.g., the 95$^{th}$ percentile threshold) for a peer network link (e.g., a link between the network 105 and the respective peer network). Setting the egress traffic threshold may be based on logical limitations rather than physical limitations. Instead of such physical limitations dictating the threshold, the network may set the threshold based on a traffic demand of the network's customers that can be satisfied by the network, the cost of egress traffic to one or more peer networks, and the amount that a customer may pay for the traffic (e.g., whether the customer is price-sensitive). In this manner, the network 105 may have sufficient capacity for traffic demand, and may meet physical link requirements for that demand, but still may divert traffic to other networks (e.g., peer networks) due to logical limitations related to customer demand and cost. For example, a higher 95$^{th}$ percentile threshold may be allowed by the load balancer 130 if a customer is known to pay higher GB/time rates. The threshold also may be dynamic, changing over time based on multiple customers use and cost, and changing traffic demand. Which customers traffic is diverted to a peer network and how much may depend on which customers are driving the traffic demand, how much the customers are willing to pay, and the cost of the egress traffic based on the threshold at the peer network.

At step 152, the load balancer 130 may direct egress traffic from the network 105 to a peer network when the traffic volume is below the logical egress traffic threshold. Metrics from the network 105 may be provided as feedback to the load balancer 130, and the load balancer 130 may determine when to allow or not allow more egress traffic to a peer link. At step 154, the load balancer 130 may direct egress traffic away from the peer network when the traffic volume is at the logical egress traffic threshold. In particular, the load balancer 130 may prevent egress traffic to a peer that would drive a target 95$^{th}$ percentile at the peer to a higher 95$^{th}$ percentile threshold. Instead, the load balancer 130 may direct the traffic within the network 105 when the network 105 has capacity, and/or may direct the traffic to one or more other peer networks (e.g., which may be settlement-free peers or peers with a lower cost rate, and/or because the customer whose traffic is to be diverted may be willing to pay for the peer network instead of increasing their logical egress traffic threshold and corresponding cost).

In one or more embodiments, which customers traffic is diverted to a peer network and how much may depend on which customers are driving the traffic demand, how much the customers are willing to pay, and the cost of the egress traffic based on the threshold at the peer network. In this manner, the load balancer 130 may direct traffic to a peer network from the network 105 when the traffic volume from the network 105 to the peer network using the pipeline between the network 105 and the peer network is below the logical egress traffic threshold to avoid not using a volume of traffic paid for by the cost set based on the 95$^{th}$ percentile. In addition, the load balancer 130 may avoid bursts of traffic being directed across a peer link to a peer network from the network 105 when the bursts may cause an increase in the 95$^{th}$ percentile, and therefore extra cost for the egress traffic.

Figure 2:
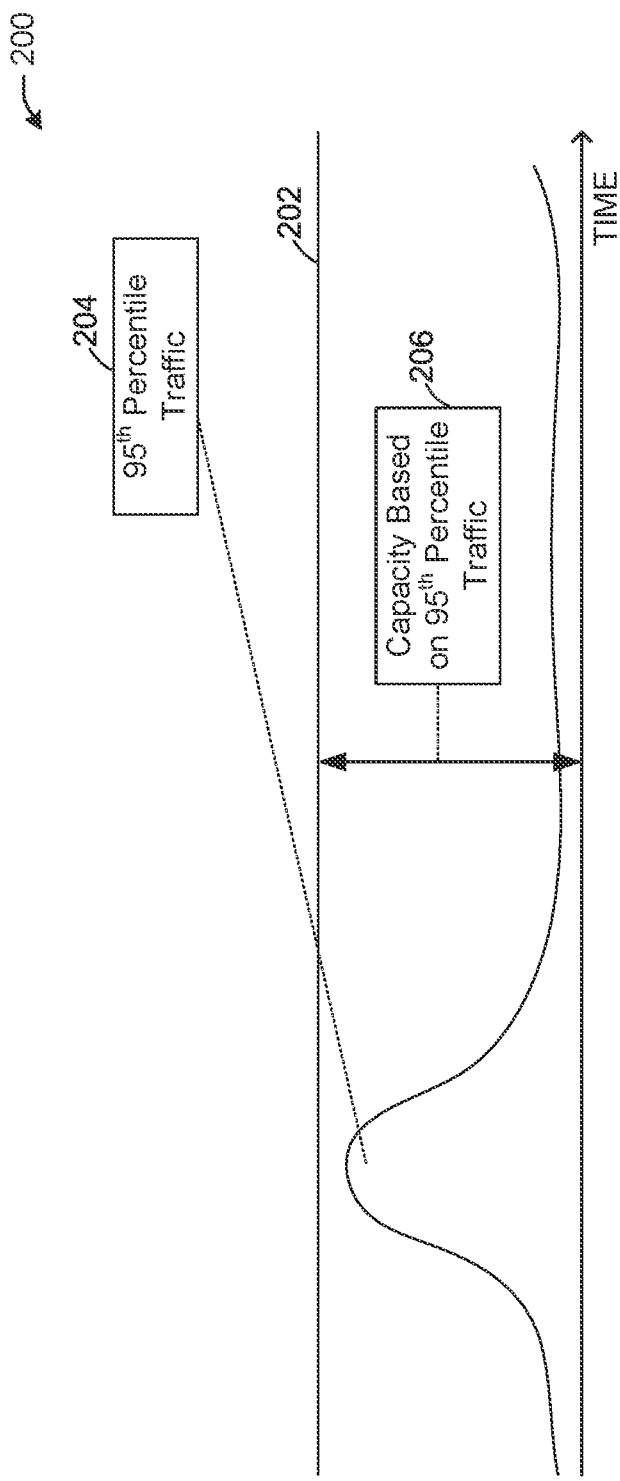
FIG. 2 illustrates an example plot of traffic volume and capacity used in a 95th percentile model in accordance with one embodiment.

FIG. 2 illustrates an example plot 200 of traffic volume and capacity used in a 95$^{th}$ percentile model in accordance with one embodiment.

Referring to FIG. 2, the plot 200 shows traffic volume and its 95$^{th}$ percentile 202 as an example threshold on which traffic volume cost may be based. 95$^{th}$ percentile traffic 204 may be below and up to the 95$^{th}$ percentile 202 threshold, and there may be times when there is capacity 206 available because the traffic is below the 95$^{th}$ percentile 202. When there is capacity 206 (e.g., logical capacity), the load balancer 130 of FIG. 1 may direct traffic to an endpoint (e.g., an ISP of a peer network) using a pipeline to use the capacity 206.

Figure 3:
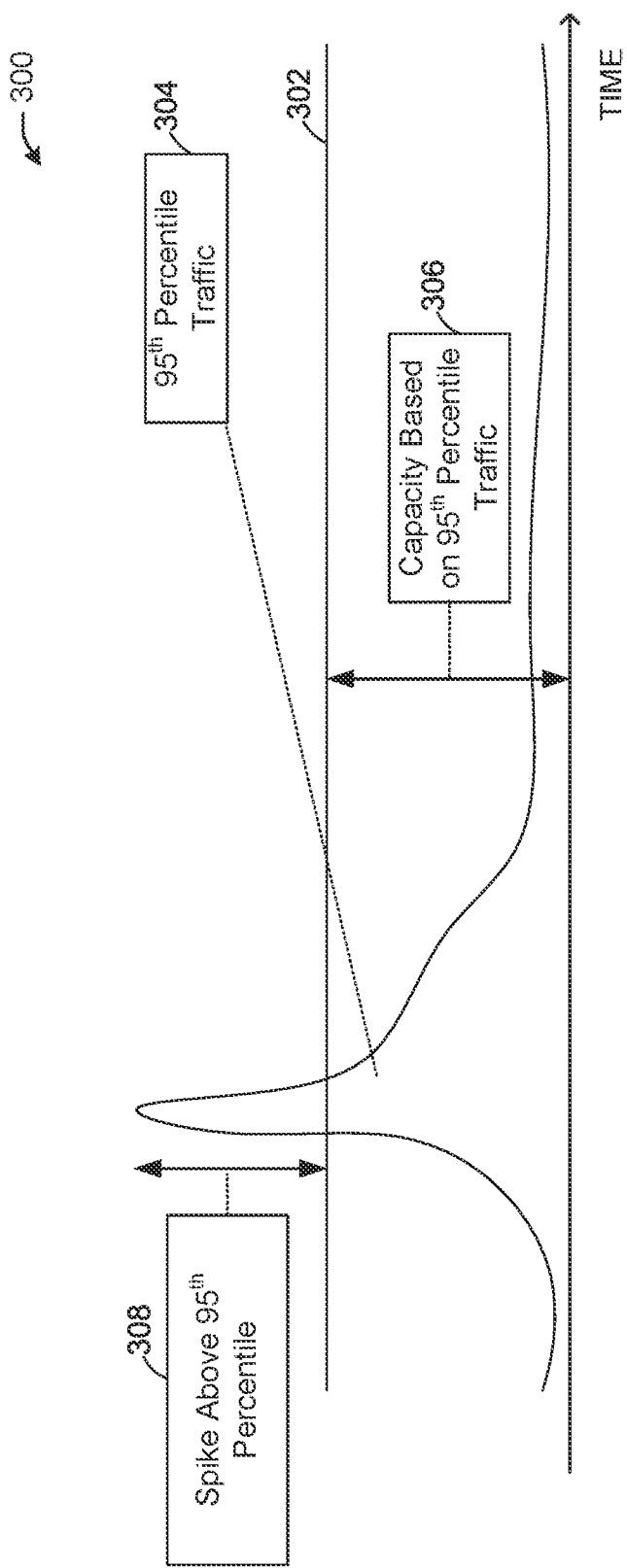
FIG. 3 illustrates an example plot of traffic volume and capacity used in a 95th percentile model in accordance with one embodiment.

FIG. 3 illustrates an example plot 300 of traffic volume and capacity used in a 95$^{th}$ percentile model in accordance with one embodiment.

Referring to FIG. 3, the plot 300 shows traffic volume and its 95$^{th}$ percentile 302 as an example threshold on which traffic volume cost may be based. 95$^{th}$ percentile traffic 304 may be below and up to the 95$^{th}$ percentile 302 threshold, and there may be times when there is capacity 306 (e.g., logical capacity) available because the traffic is below the 95$^{th}$ percentile 302. When there is capacity 206, the load balancer 130 of FIG. 1 may direct traffic to an endpoint (e.g., an ISP of a peer network) using a pipeline to use the capacity 306. The plot 300 also shows when there is a spike 308 (e.g., traffic burst) above the 95$^{th}$ percentile 302. The spike 308 may represent traffic above the 95$^{th}$ percentile for which no additional cost is incurred because the cost may be based on the 95$^{th}$ percentile 302. However, to avoid significant spikes that would increase the 95$^{th}$ percentile 302, the load balancer 130 may avoid directing traffic to the endpoint whose traffic volume has reached or exceeded the 95$^{th}$ percentile 302 (e.g., even when the peer network has physical capacity), instead directing the traffic to another endpoint (e.g., of one or more other peer networks).

Referring to FIGS. 2 and 3, carriers (e.g., the network 105, the peer network 120, the peer network 125) may sample the amount of data transferred on a customer's port in time intervals, such as every five minutes, and use that data amount to determine a data rate used for that time interval. The values for multiple time intervals over a billing cycle (e.g., a month) may be ranked by percentile, and the value on the 95$^{th}$ percentile 202 or 302 may be used to bill a customer. The higher a customer's base commitment rate, the lower their traffic volume cost (e.g., per-Mbps cost) may be.

Figure 4:
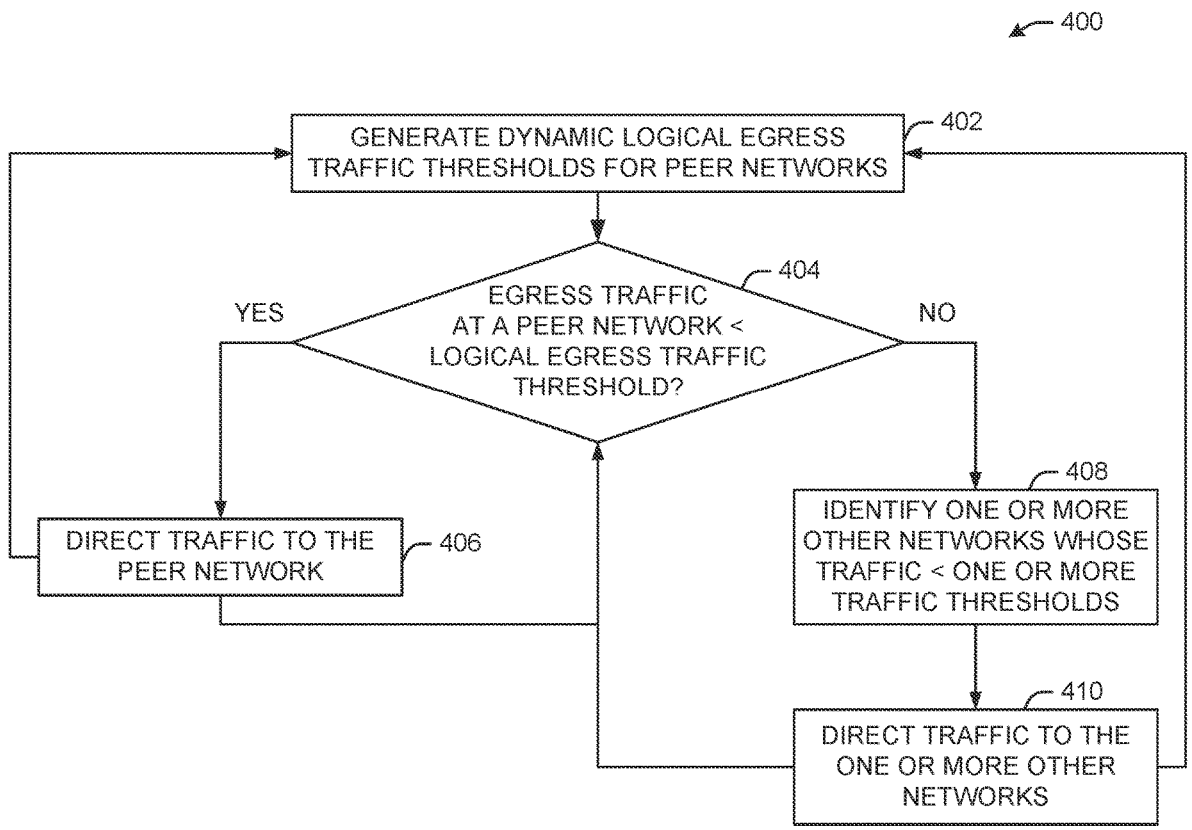
FIG. 4 is a flowchart illustrating a process for pre managing egress traffic to peer communication networks in accordance with one embodiment.

FIG. 4 is a flowchart illustrating a process 400 for managing egress traffic to peer communication networks in accordance with one embodiment.

At block 402, a device (or system, e.g., the network 105 of FIG. 1, the traffic flow devices 509 of FIG. 5) may generate dynamic logical egress traffic thresholds for peer networks (e.g., the peer network 120, the peer network 125 of FIG. 1). Different peer networks may have different logical egress traffic thresholds, which may change/update at different times. For example, a logical egress traffic threshold may be a 95$^{th}$ percentile of egress traffic from a network (e.g., the network 105) to a respective peer network, which may be a paid peer ISP or a settlement-free ISP.

At block 404, the device may determine whether egress traffic at a peer network is less than the logical egress traffic threshold for that peer network. For example, using metrics from the network as feedback to the device, the device may determine when to allow or not allow more egress traffic to a peer link. The threshold may be a 95$^{th}$ percentile threshold, or a threshold below the 95$^{th}$ percentile threshold to allow a buffer and avoid increasing the 95$^{th}$ percentile above a target 95$^{th}$ percentile (e.g., a dynamic logical egress traffic threshold).

At block 406, when the egress traffic at a peer network is less than the logical egress traffic threshold for that peer network at block 404, the device may direct traffic to the peer network (e.g., because the peer network has logical capacity that is not being fully used).

At block 408, when the egress traffic at a peer network is at or exceeding the logical egress traffic threshold for that peer network at block 404, the device may direct traffic away from the peer network (e.g., to avoid increasing the logical egress traffic threshold and associated usage cost at the peer network). For example, the device may identify one or more networks whose traffic is below a threshold (e.g., a logical egress traffic threshold and/or a physical traffic threshold) and therefore has logical and/or physical capacity and to which the traffic may be diverted instead of to the peer network. The one or more networks may include one or more other peer networks and/or the network itself. At block 410, the device may direct the traffic to the one or more other networks. Alternatively, when egress traffic is above the logical egress traffic threshold, the device may continue to direct egress traffic to the peer network (e.g., because the traffic is in the top $5^{th}$ percentile that may not be charged). When the egress traffic at the peer network is below the logical egress traffic threshold, but within a buffer amount of the logical egress traffic threshold (e.g., between the logical egress traffic threshold and a lower threshold), the device may direct traffic away from the peer network.

Referring to blocks 406-410, which customers traffic is diverted to a peer network and how much may depend on which customers are driving the traffic demand, how much the customers are willing to pay, and the cost of the egress traffic based on the threshold at the peer network.

It is understood that the above descriptions are for purposes of illustration and are not meant to be limiting.

Figure 5:
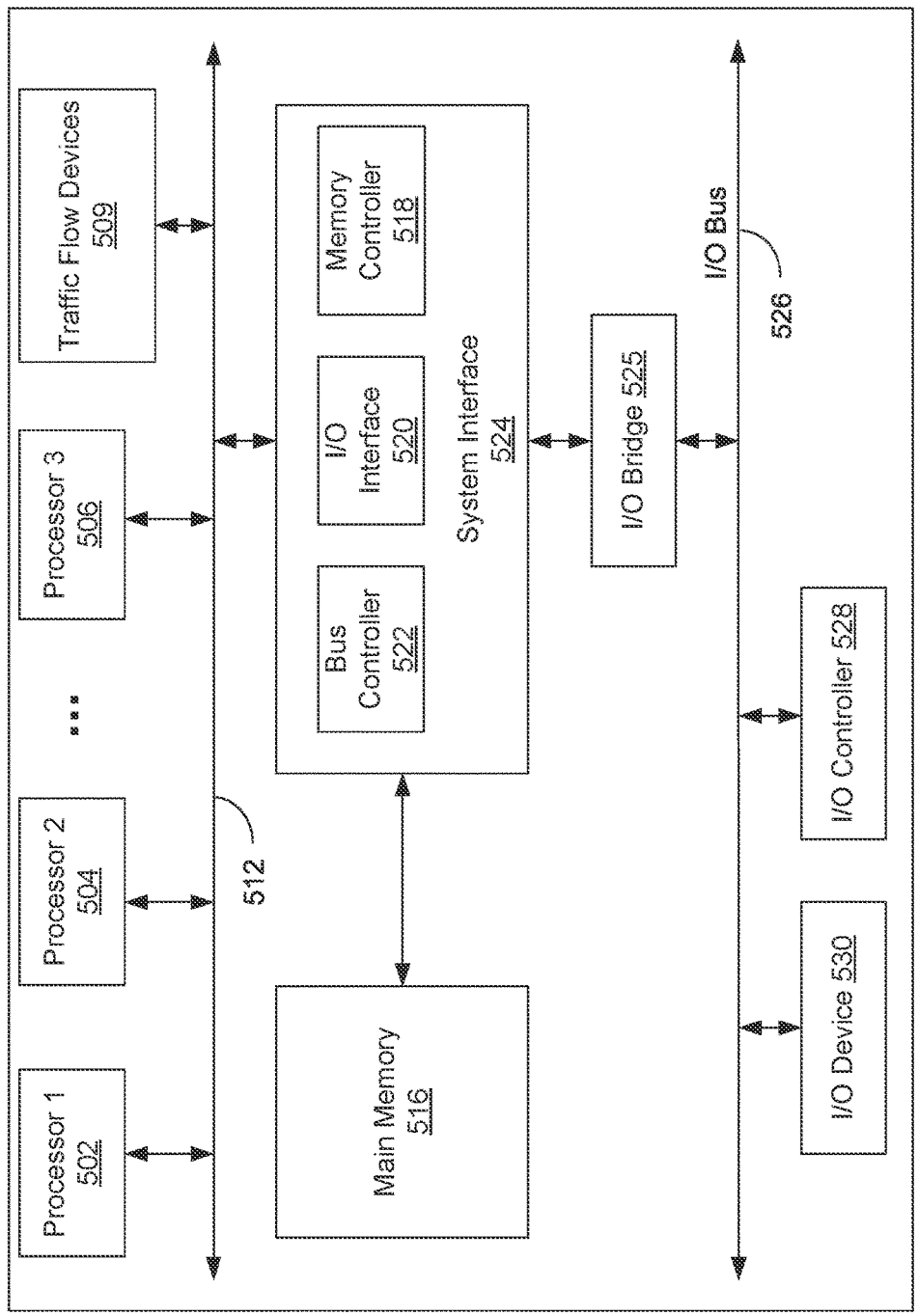
FIG. 5 is a diagram illustrating an example of a computing system that may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may represent at least a portion of the network 105 of FIG. 1, and discussed above. The computer system (system) includes one or more processors 502-506 and one or more traffic flow devices 509 (e.g., capable of performing any operations described with respect to FIGS. 1-4). Processors 502-506 may include one or more internal levels of cache (not shown) and a bus controller 522 or bus interface unit to direct interaction with the processor bus 512. Processor bus 512, also known as the host bus or the front side bus, may be used to couple the processors 502-506 with the system interface 524. System interface 524 may be connected to the processor bus 512 to interface other components of the system 500 with the processor bus 512. For example, system interface 524 may include a memory controller 518 for interfacing a main memory 516 with the processor bus 512. The main memory 516 typically includes one or more memory cards and a control circuit (not shown). System interface 524 may also include an input/output (I/O) interface 520 to interface one or more I/O bridges 525 or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system outlined in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A method of managing egress traffic to a peer network, the method comprising:
   generating, by a device, using a load balancer of a network, a logical egress traffic threshold for a peer network;
   determining, by the device, using the load balancer, that first traffic from the network to the peer network is below the logical egress traffic threshold;
   directing, by the device, second traffic from the network to the peer network based on the determination that the first traffic is below the logical egress traffic threshold;
   determining, by the device, using the load balancer, that the second traffic from the network to the peer network has reached the logical egress traffic threshold;
   directing, by the device, third traffic from the network away from the peer network based on the determination that the second traffic has reached the logical egress traffic threshold; and
   determining that fourth traffic from the network to a second peer network is below a second logical egress traffic threshold,
   wherein directing the third traffic away from the peer network comprises directing the third traffic to the second peer network based on the determination that the fourth traffic is below the second logical egress traffic threshold.

2. The method of claim 1, wherein the logical egress traffic threshold is a 95th percentile of traffic volume from the network to the peer network.

3. The method of claim 1, wherein generating the logical egress traffic threshold is based on a traffic demand of customers of the network and a traffic capacity available at the network.

4. The method of claim 1, wherein generating the logical egress traffic threshold is based on a cost of egress traffic to the peer network and a price sensitivity of a customer associated with the third traffic.

5. The method of claim 1, wherein the logical egress traffic threshold is a first logical egress traffic threshold at a first time, the method further comprising:
   generating, using the load balancer, the second logical egress traffic threshold for the peer network at a second time, the second logical egress traffic threshold different than the first logical egress traffic threshold;
   determining, using the load balancer, that fourth traffic from the network to the peer network is below the second logical egress traffic threshold; and
   directing fifth traffic from the network to the peer network based on the determination that the fourth traffic is below the second logical egress traffic threshold.

6. The method of claim 1, further comprising:
   generating, using the load balancer, the second logical egress traffic threshold for a second peer network, the second logical egress traffic threshold different than the logical egress traffic threshold;
   determining, using the load balancer, that fourth traffic from the network to the second peer network has reached the second logical egress traffic threshold; and
   directing fifth traffic from the network away from the second peer network based on the determination that the second traffic has reached the second logical egress traffic threshold.

7. The method of claim 1, wherein the peer network is a paid peer internet service provider, wherein the second peer network is a settlement-free peer internet service provider, and wherein directing the third traffic to the second peer network is based on determining that the second peer network is a settlement-free peer internet service provider.

8. The method of claim 1, wherein the network is a content delivery network.

9. A device for managing egress traffic to a peer network, the device comprising memory coupled to at least one processor, wherein the at least one processor is configured to:
   generate, using a load balancer of a network, a logical egress traffic threshold for a peer network;
   determine, using the load balancer, that first traffic from the network to the peer network is below the logical egress traffic threshold;
   direct second traffic from the network to the peer network based on the determination that the first traffic is below the logical egress traffic threshold;
   determine, using the load balancer, that the second traffic from the network to the peer network has reached the logical egress traffic threshold;
   direct third traffic from the network away from the peer network based on the determination that the second traffic has reached the logical egress traffic threshold; and
   determine that fourth traffic from the network to a second peer network is below a second logical egress traffic threshold,
   wherein directing the third traffic away from the peer network comprises directing the third traffic to the second peer network based on the determination that the fourth traffic is below the second logical egress traffic threshold.

10. The device of claim 9, wherein the logical egress traffic threshold is a 95th percentile of traffic volume from the network to the peer network.

11. The device of claim 9, wherein to generate the logical egress traffic threshold is based on a traffic demand of customers of the network and a traffic capacity available at the network.

12. The device of claim 9, wherein to generate the logical egress traffic threshold is based on a cost of egress traffic to the peer network and a price sensitivity of a customer associated with the third traffic.

13. The device of claim 9, wherein the logical egress traffic threshold is a first logical egress traffic threshold at a first time, and wherein the at least one processor is further configured to:
   generate, using the load balancer, the second logical egress traffic threshold for the peer network at a second time, the second logical egress traffic threshold different than the first logical egress traffic threshold;
   determine, using the load balancer, that fourth traffic from the network to the peer network is below the second logical egress traffic threshold; and direct fifth traffic from the network to the peer network based on the determination that the fourth traffic is below the second logical egress traffic threshold.

14. The device of claim 9, wherein the at least one processor is further configured to:
   generate, using the load balancer, the second logical egress traffic threshold for a second peer network, the second logical egress traffic threshold different than the logical egress traffic threshold;
   determine, using the load balancer, that fourth traffic from the network to the second peer network has reached the second logical egress traffic threshold; and
   direct fifth traffic from the network away from the second peer network based on the determination that the second traffic has reached the second logical egress traffic threshold.

15. The device of claim 9, wherein the peer network is a paid peer internet service provider, wherein the second peer network is a settlement-free peer internet service provider, and wherein directing the third traffic to the second peer network is based on determining that the second peer network is a settlement-free peer internet service provider.

16. The device of claim 9, wherein the network is a content delivery network.

17. A system for managing egress traffic to a peer network, the system comprising:
   a load balancer of a network; and
   at least one processor coupled to memory, the at least one processor configured to:
      generate, using the load balancer, a logical egress traffic threshold for a peer network;
      determine, using the load balancer, that first traffic from the network to the peer network is below the logical egress traffic threshold;
      direct second traffic from the network to the peer network based on the determination that the first traffic is below the logical egress traffic threshold;
      determine, using the load balancer, that the second traffic from the network to the peer network has reached the logical egress traffic threshold;
      direct third traffic from the network away from the peer network based on the determination that the second traffic has reached the logical egress traffic threshold; and
      determine that fourth traffic from the network to a second peer network is below a second logical egress traffic threshold,
   wherein directing the third traffic away from the peer network comprises directing the third traffic to the second peer network based on the determination that the fourth traffic is below the second logical egress traffic threshold.

18. The system of claim 17, wherein the logical egress traffic threshold is a 95th percentile of traffic volume from the network to the peer network.

* * * * *